United States Patent Office 2,824,862
Patented Feb. 25, 1958

2,824,862

SUSPENSION POLYMERIZATION OF VINYL HALIDE PRODUCTS

Raymond I. Longley, Jr., and Richard H. Martin, Jr., Springfield, Mass., assignors to Monsanto Chemical Company, St. Louis, Mo., a corporation of Delaware No Drawing. Application August 26, 1955
Serial No. 530,881

12 Claims. (Cl. 260—92.8)

This invention relates to the polymerization of vinyl halide-containing materials. More particularly, this invention relates to the preparation of polymers and copolymers of vinyl halides in granular form.

In one of the customary preparations of vinyl halide-containing polymers, the monomers are polymerized in an aqueous medium containing a dispersing agent to obtain the polymer in the form of small granules which are easily separated from the polymerization medium by filtration. Ideally, the granular polymers so obtained should be of a uniform small size and highly porous in nature so as to readily absorb plasticizers. The presence of large, nonporous, glassy granules is undesirable, since such granules do not readily absorb plasticizer and this frequently leads to heterogeneity in the final product. Such heterogeneity is particularly noticeable when the vinyl halide-containing polymer is calendered into thin films.

Many of the dispersing agents that have been suggested have been subject to certain difficulties. For example, many of the dispersing agents do not give porous granules of the desired small size. With ionic dispersing agents, a serious problem arises in the removal of the dispersing agent from the polymeric material. Certain dispersing agents are undesirable in that they detract from the stability of the polymeric product.

Heteropolymers of vinyl acetate and maleic anhydride have been proposed as dispersing agents in vinyl halide polymerizations. Although such polymers are among the best dispersing agents known to date, they too are subject to certain short-comings. For example, the acetate groups of these dispersing agents are subject to hydrolysis which adversely affects the dispersing properties of the polymer. Other heteropolymers of maleic anhydride with such monomers as styrene, vinyl methyl ether, etc. also have been suggested as dispersing agents in vinyl halide polymerizations, but these heteropolymers give an undesirably large granular polymer, or adversely affect the stability of the vinyl halide-containing polymer or both.

It is an object of this invention to provide an improved process for the preparation of vinyl halide-containing polymers.

Another object of this invention is to provide an improved process for the preparation of vinyl halide-containing polymers in granular form.

Other objects and advantages of this invention will become apparent from the following detailed description thereof.

It has been discovered that granular vinyl halide-containing polymers of consistently excellent quality can be prepared by dispersing and polymerizing the vinyl halide monomer in a dilute aqueous solution of a partial ester of an interpolymer of ethylene and maleic acid, maleic anhydride or mixtures thereof. The dispersing agents employed in this process are characterized by (1) being derived from an interpolymer of ethylene and a compound selected from the group consisting of maleic acid, maleic anhydride or mixtures thereof, said interpolymer, when in the anhydride form, having a specific viscosity of at least 1.1 as determined in a 1% solution of dimethylformamide at 25° C., (2) having up to 15 mol percent of the carboxyl groups of the interpolymer esterified with a monohydric alcohol containing up to 10 carbon atoms and being otherwise free of reactive functional groups, (3) having the alcohol portion of the ester groups constitute not over 20 weight percent of the dispersing agent and (4) being free of salt groups.

The following examples are set forth to illustrate more clearly the principle and practice of this invention to those skilled in the art. All parts are by weight.

EXAMPLE I

*Part A*

A partial tetrahydrofurfuryl ester of an ethylene-maleic anhydride interpolymer is prepared by reacting 95 parts of an ethylene-maleic anhydride interpolymer having a specific viscosity of 1.65 (determined in a 1% solution in dimethylformamide at 25° C.) with 5 parts of tetrahydrofurfuryl alcohol in 100 parts of toluene. In the resulting product 3.2 mol percent of the carboxyl groups of the ethylene-maleic anhydride interpolymer are esterified.

*Part B*

Part A is repeated except that 90 parts of the ethylene-maleic anhydride interpolymer are esterified with 10 parts of tetrahydrofurfuryl alcohol to give a product in which 6.2 mol percent of the carboxyl groups of the ethylene-maleic anhydride interpolymers are esterified.

*Part C*

Part A is repeated except that 85 parts of the ethylene-maleic anhydride interpolymer are esterified with 15 parts of tetrahydrofurfuryl alcohol to give a product in which 9.6 mol percent of the carboxyl groups of the ethylene-maleic anhydride interpolymer are esterified.

EXAMPLE II

*Part A*

Into a glass reaction vessel are charged 145 parts of water, 0.25 parts of lauroyl peroxide and 10 parts of a 1% aqueous solution of the partial tetrahydrofurfuryl ester of the ethylene-maleic anhydride interpolymer of Example I, Part A. The atmosphere in the reaction vessel is swept free of oxygen with gaseous vinyl chloride monomer and 100 parts of vinyl chloride are charged to the reaction vessel which is then sealed. The sealed glass reaction vessel is rotated end over end at 50° C. for 20 hours at the end of which time the polymerization is complete.

The product has a desirable small particle size with approximately 52% of the particles passing through a 100 mesh screen and less than 1% of the polymer particles being retained on a 40 mesh screen. The polymer product readily absorbs plasticizer, has excellent heat and light stability and has good electrical insulating properties.

*Part B*

Part A is repeated employing the dispersing agents of Example I, Parts B and C. Comparable results are obtained.

*Part C*

Three additional polymerizations are carried out employing the materials and procedure of Part A above except that 8, 30 and 50 parts, respectively, of the 1% aqueous solution of dispersing agent are employed in lieu of the 10 parts employed in Part A. A concomitant adjustment is made in the parts of water charged so that the parts of water charged plus the parts of dispersing agent solution charged total 155 parts. In each polymerization the product is obtained in the form of a fine powder.

EXAMPLE III

Several partial esters of ethylene-maleic anhydride interpolymers are prepared following the general procedure outlined in Example I, Part A. The alcohol employed, the proportions of alcohol and ethylene-maleic anhydride interpolymer employed, the specific viscosity of the ethylene-maleic anhydride interpolymer employed and the mol percent of the carboxyl groups of the ethylene-maleic anhydride interpolymer esterified are set forth below in Table I.

TABLE I

| Run | Parts Ethylene-Maleic Anhydride Interpolymer Employed | Specific Viscosity Ethylene-Maleic Anhydride Interpolymer Employed [1] | Alcohol Employed | Parts Alcohol Employed | Mol Percent Carboxyl Groups of Ethylene-Maleic Anhydride Interpolymer Esterified |
|---|---|---|---|---|---|
| A | 95 | 1.1 | Methanol | 5 | 10 |
| B | 90 | 1.1 | Isopropanol | 10 | 12 |
| C | 90 | 1.1 | n-Butanol | 10 | 9 |
| D | 95 | 1.3 | Cyclohexanol | 5 | 3 |
| E | 95 | 1.6 | n-Decanol | 5 | 2 |
| F | 95 | 2.0 | Methoxyethanol | 5 | 4 |

[1] Determined in 1-percent solution in dimethylformamide at 25° C.

EXAMPLES IV-IX

Six polymerizations are carried out following the procedure of Example II, Part A, except that the partial esters of the ethylene-maleic anhydride interpolymers prepared in Example III are employed as the dispersing agent. In each case the polymer is obtained in the form of a fine powder and, when formed into a film, has excellent electrical insulating properties.

EXAMPLES X-XIV

Several additional polymerizations are carried out employing the polymerization systems set forth in Table II. All parts are by weight.

TABLE II

| Example | X | XI | XII | XIII | XIV |
|---|---|---|---|---|---|
| Vinyl Chloride | 100 | 90 | 95 | 100 | 90 |
| Vinyl Acetate | | 10 | | | |
| Diethyl Maleate | | | 5 | | 10 |
| Glyceryl Mono-octadecanoate | 0.1 | | | | 0.1 |
| Dibutyl Phthalate | | | | 5 | |
| Water | 150 | 160 | 150 | 150 | 150 |
| Benzoyl Peroxide | 0.2 | | | 0.2 | |
| Lauroyl Peroxide | | 0.2 | 0.3 | | 0.3 |
| Partial Tetrahydrofurfuryl Ester of Ethylene-Maleic Anhydride Interpolymer [1],[2] | 0.1 | 0.2 | 0.2 | 0.2 | 0.1 |
| Temperature, °C | 50 | 50 | 50 | 50 | 50 |
| Duration, Hours | 20 | 20 | 20 | 20 | 20 |

[1] Product Example I, Part A.
[2] Charged as a 1% aqueous solution.

Each of the polymers is obtained in a fine granular form and has good electrical insulating properties.

The dispersing agents employed are derived from interpolymers of ethylene and maleic acid, maleic anhydride or mixtures thereof which, when in the anhydride form, have a specific viscosity of at least 1.1, as determined in a 1% solution in dimethylformamide at 25° C. Specific viscosity is determined in accordance with the well known formula:

$$\text{Specific viscosity} = \frac{\text{solution viscosity} - \text{solvent viscosity}}{\text{solvent viscosity}}$$

In a preferred embodiment of the invention, the dispersing agents are derived from interpolymers having a specific viscosity of at least 1.2.

The dispersing agents may be derived directly from interpolymers of ethylene and maleic acid, maleic anhydride or mixtures thereof by esterification or alternatively by dissolving a partial esterification product of maleic acid, maleic anhydride or mixtures thereof and a free radical generating catalyst in an aromatic solvent such as benzene and heating under autogeneous ethylene pressure in a sealed reaction vessel. Another alternative method for preparing the dispersing agents is to dissolve the esterifying alcohol and maleic acid, maleic anhydride or mixtures thereof in an aromatic hydrocarbon solvent with a free radical generating catalyst and heating under autogeneous ethylene pressure. The dispersing agents prepared by any of these procedures nearly always contain approximately equimolar proportions of ethylene and maleic constituents regardless of the particular reaction conditions employed. The dispersing agents derived from either maleic acid or maleic anhydride are equivalents in the practice of the present invention, since on dissolution in water the maleic anhydride groups hydrolyze to the free acid.

When the dispersing agents are prepared from the interpolymers of ethylene and maleic acid or maleic anhydride by indirect means, as by interpolymerizing ethylene with a partial esterification product of maleic anhydride, they must have a specific viscosity at least as high as that obtained by esterifying an ethylene-maleic anhydride interpolymer of 1.1 specific viscosity to the same degree with the same alcohol.

The alcohols employed in preparing the partial esters of interpolymers of ethylene and maleic acid or maleic anhydride are monohydric alcohols containing up to 10 carbon atoms. Such monohydric alcohols may be acyclic, heterocyclic or carbocyclic in nature. Examples of suitable alcohols include methanol, ethanol, isopropanol, hexanol, octanol, decanol, cyclopentanol, cyclohexanol, phenol, cresol, xylenol, etc. The alcoholic hydroxyl group is preferably a primary or secondary hydroxyl group and except for the alcoholic hydroxyl group itself, the monohydric alcohols employed are otherwise free of reactive groups such as carboxyl groups, amino groups, amide groups, etc. For the purposes of the present invention ether groups are not considered to be reactive groups. Thus, it is feasible to employ monohydric ether alcohols such as those obtained by condensing one or a plurality of ethylene oxide or propylene oxide molecules with a monohydric alcohol.

The quantity of monohydric alcohol employed is sufficient to esterify up to 15 mol percent of the carboxyl groups of the interpolymer of ethylene and maleic acid or maleic anhydride. In the case of the higher molecular weight monohydric alcohols the quantity that may be employed is restricted by a second provision that the alcohol portion of the molecule should constitute not over 20 weight percent of the compound.

A desirable feature of the present invention is that the partial esters of the interpolymers of ethylene and maleic acid or maleic anhydride are stable in aqueous solutions for long periods of time. Thus, in commercial practice, the dispersing agents will be dissolved in water to prepare large volumes of concentrated dispersing agent solution which can be stored and used as needed.

Usually only a small concentration of the dispersing agent of this invention is necessary, e. g. 0.005-2.0% and more particularly 0.04-0.5% based on the amount of water used is usually sufficient. The amount of dispersing agent to be used in any particular polymerization system depends upon a number of factors and by controlling the concentration of dispersing agent employed under a given set of polymerization conditions it is possible to obtain the vinyl halide-containing polymer in a controlled, desired particle size. Among the more important parameters which affect the concentration of the dispersing agent to be employed is the water:monomer ration. Thus, as the water-monomer ratio is increased, the ratio of dispersing agent to water may be decreased if the same average particle size is desired in the polymer. Other factors affecting the amount of dispersing agent to be employed in the polymerization include the particle size desired in the polymer and the speed of agitation. Frequently, there is found to be an optimum amount of dispersing agent to be employed for obtaining a minimum particle size and amounts of dispersing agent above or below this optimum amount produce polymers having a larger particle size. It is usually preferred to employ the smallest amount of dispersing agent that will produce polymers of the desired particle size.

Where it is desired to obtain the granular vinyl halide-containing polymer in an extremely fine particle size, it is sometimes desirable to employ certain particle size reducing agents in conjunction with the partial ester of the interpolymer of ethylene and maleic acid or maleic anhydride. Examples of the particle size reducing agents that can be used for this purpose include (1) unsaturated aliphatic carboxylic acids containing from 10 to 20 carbon atoms, (2) hydroxyl group-substituted aliphatic carboxylic acids containing from 10 to 20 carbon atoms, (3) halogen substituted unsaturated aliphatic carboxylic acids having from 10 to 20 carbon atoms and (4) partial esters of polyhydric alcohols and aliphatic carboxylic acids, said alcohols having from 2 to 8 carbon atoms, said acids having from 10 to 20 carbon atoms. Such particle size reducing agents are employed in the amount of about 0.01% to about 5.0%, based on the monomeric materials. The best results usually are obtained with glyceryl mono-octadecanoate.

It is sometimes observed that a reduction in particle size is obtained by carrying out the polymerization in the presence of 0.5-15% of certain plasticizers such as (1) dialkyl phthalates in which the alkyl groups contain 2 to 10 carbon atoms, (2) glycol esters of fatty acids, said glycols containing not more than 10 carbon atoms and said fatty acids containing 2 to 9 carbon atoms and (3) phospheric acid esters of hydroxybenzenes from the group consisting of phenol, cresols and xylenols. The particle size reduction obtained by polymerizing in the presence of these plasticizers is not necessarily additive to that obtained with the use of the particle size reducing agents discussed in the paragraph immediately above.

Except for the particular dispersing agent employed, the polymerizations of the present invention are carried out in the conventional manner. The ratio of water to monomers may vary from 1:1 to approximately 9:1, but is ordinarily set in the range of about 1.5:1. The polymerization initiators employed are normally free radical generating catalysts such as bis-azoisobutyronitrile, benzoyl peroxide, lauroyl peroxide, ditertiary butyl peroxide, oleyl peroxide, toluyl peroxide and the like.

The process of the present invention is useful in the polymerization of vinyl fluoride, vinyl chloride and vinyl bromide and the copolymerization of such vinyl halides with such copolymerizable essentially water-insoluble unsaturated compounds as vinyl esters of carboxylic acid, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; amides such as acrylic acid amide, acrylic acid analide; nitriles, such as acrylic acid nitrile; vinylidene chloride; trichloroethylene; esters of $\alpha,\beta$-unsaturated polycarboxylic acids, for example, the methyl, ethyl, propyl, butyl amyl, hexyl, heptyl, octyl, allyl and methallyl esters of maleic, itaconic and fumaric acids and the like. Preferably, in the case of copolymerization, a predominate portion, i. e. more than 50% by weight, of the mixture of monomers is a vinyl halide, and especially vinyl chloride.

The above description and particularly the examples are set forth by way of illustration only and it will be obvious that many variations and departures therefrom can be made without departing from the spirit and scope of the invention herein described.

What is claimed is:

1. In a process for preparing polymerization products in granular form, the improvement which comprises polymerizing an aqueous dispersion of a polymerizable material containing a vinyl halide from the group consisting of vinyl fluoride, vinyl chloride and vinyl bromide in the presence of, as a dispersing agent, an interpolymer of a monomeric mixture consisting of essentially equimolar proportions of ethylene and a maleic compound selected from the group consisting of maleic acid, maleic anhydride and mixtures thereof, said interpolymer being partially esterified with a monohydric alcohol containing 1-10 carbon atoms, said dispersing agent being further characterized by (1) the interpolymer of ethylene and the maleic compound, prior to esterification and when in the anhydride form, having a specific viscosity of at least 1.1, as determined in a 1% solution in dimethylformamide at 25° C., (2) having up to 15 mol percent of the carboxyl groups of the interpolymer esterified with said monohydric alcohol and being otherwise free of reactive functional groups, the acohol portion of said ester groups constituting not over 20 weight percent of the dispersing agent, and (3) being free of salt groups.

2. A process as defined in claim 1 in which the polymerizable material is vinyl chloride.

3. A process as defined in claim in which the dispersing agent is present in the proportion of 0.005 to 2.0% based on the amount of water.

4. A process as defined in claim 1 in which the dispersing agent is present in the proportion of 0.04-0.5% based on the amount of water.

5. A process as defined in claim 1 in which the polymerizable material is a mixture of vinyl chloride and vinyl acetate.

6. A process as defined in claim 1 in which the dispersing agent employed is a partial methyl ester of an interpolymer of ethylene and a compound selected from the group consisting of maleic acid, maleic anhydride and mixtures thereof.

7. A process as defined in claim 1 in which the dispersing agent employed is a partial isopropyl ester of an interpolymer of ethylene and a compound selected from the group consisting of maleic acid, maleic anhydride and mixtures thereof.

8. A process as defined in claim 1 in which the dispersing agent employed is a partial butyl ester of an interpolymer of ethylene and a compound selected from the group consisting of maleic acid, maleic anhydride and mixtures thereof.

9. A process as defined in claim 1 in which the dispersing agent employed is a partial methoxyethyl ester of an interpolymer of ethylene and a compound selected from the group consisting of maleic acid, maleic anhydride and mixtures thereof.

10. A process as defined in claim 1 in which the dispersing agent employed is a partial tetrahydrofurfuryl ester of an interpolymer of ethylene and a compound selected from the group consisting of maleic acid, maleic anhydride and mixtures thereof.

11. A process as defined in claim 1 in which the polymerizable material is a mixture of vinyl chloride and an alkyl ester of an α,β-unsaturated dicarboxylic acid.

12. A process as defined in claim 11 in which the alkyl ester of the α,β-unsaturated dicarboxylic acid employed is diethylmaleate.

References Cited in the file of this patent

UNITED STATES PATENTS

| | | |
|---|---|---|
| 2,306,071 | McNally | Dec. 22, 1942 |
| 2,476,474 | Baer | July 19, 1949 |

FOREIGN PATENTS

| | | |
|---|---|---|
| 143,031 | Australia | Aug. 22, 1951 |